(12) United States Patent
Meincke et al.

(10) Patent No.: US 8,730,947 B2
(45) Date of Patent: May 20, 2014

(54) REVERSE CALL SET UP VIA AN INTERCONNECTION BETWEEN DIFFERENT NETWORKS

(75) Inventors: Wilhelm Meincke, Ratingen (DE); Dietmar Kohnenmergen, Dormagen (DE)

(73) Assignee: Koninklijke KPN N.V., The Hague (NL)

( * ) Notice: Subject to any disclaimer, the term of this patent is extended or adjusted under 35 U.S.C. 154(b) by 680 days.

(21) Appl. No.: 12/663,449

(22) PCT Filed: Jun. 11, 2008

(86) PCT No.: PCT/EP2008/004668
§ 371 (c)(1),
(2), (4) Date: Dec. 7, 2009

(87) PCT Pub. No.: WO2008/151786
PCT Pub. Date: Dec. 18, 2008

(65) Prior Publication Data
US 2010/0177662 A1 Jul. 15, 2010

(30) Foreign Application Priority Data
Jun. 11, 2007 (EP) .................................... 07011417

(51) Int. Cl.
*H04L 12/66* (2006.01)
(52) U.S. Cl.
USPC ............................ 370/352; 370/465; 370/467
(58) Field of Classification Search
None
See application file for complete search history.

(56) References Cited

U.S. PATENT DOCUMENTS

| 5,625,884 | A  | * | 4/1997 | Gitlin et al. ............... 455/426.1 |
| 6,636,504 | B1 |   | 10/2003 | Albers et al. |
| 6,731,907 | B1 | * | 5/2004 | Seon .......................... 455/67.11 |
| 2003/0162526 | A1 |   | 8/2003 | Ogman et al. |
| 2005/0180552 | A1 |   | 8/2005 | Honda et al. |
| 2008/0101567 | A1 | * | 5/2008 | Baudino et al. .......... 379/114.01 |
| 2008/0279177 | A1 | * | 11/2008 | Shlomot ....................... 370/352 |

FOREIGN PATENT DOCUMENTS

| EP | 0687118 | 12/1995 |
| GB | 2369270 | 5/2002 |
| JP | 07 221881 | 8/1995 |
| JP | 2004 260331 | 9/2004 |
| WO | WO98/09456 | 3/1998 |
| WO | WO03/077516 | 9/2003 |

OTHER PUBLICATIONS

PCT International Search Report, PCT Application No. PCT/EP2008/004668 Dated Oct. 24, 2008.
European Search Report, European Application No. 07011417.8 dated Nov. 30, 2007.

* cited by examiner

*Primary Examiner* — Marcus R Smith
*Assistant Examiner* — Mark A Mais
(74) *Attorney, Agent, or Firm* — McDonnell Boehnen Hulbert Berghoff LLP

(57) ABSTRACT

To set up connections via interconnections between different networks (1, 2) (2, 3), in first networks (1) e.g. public fixed networks (first step), first information is received defining at least first parts of the connections within the first networks (1). In response, (second step) second information is sent to second networks (2) e.g. public mobile networks defining the charging control of at least the interconnections to be performed outside the first networks (1) and defining at least second parts of the connections. In response, (third step) the second parts of the connections are set up within the second networks (2). The connections comprise the first parts, the interconnections and the second parts. This way, "call back" calls can be set up without "normal" calls needing to precede these "call back" calls.

5 Claims, 7 Drawing Sheets

REVERSE CALL SET UP VIA AN INTERCONNECTION BETWEEN DIFFERENT NETWORKS

CROSS REFERENCE TO RELATED APPLICATIONS

The present application is a national stage entry of PCT/EP/004668, filed on Jun. 11, 2008, and claims priority to European Patent Application EP 07011417.8, filed in the European Patent Office on Jun. 11, 2007, the entire contents of both of which are incorporated herein by reference.

The invention relates to a method for setting up a connection via an interconnection between different networks, and also relates to a first module for a first network, to a first sub-method for a first network, to a second module for a second network, to a second sub-method for a second network, to a third module for a third network, to a third sub-method for a third network, and to an arrangement comprising a module.

Examples of such different networks are first networks such as public fixed networks and other kinds of public or private networks, second networks such as public mobile networks and other kinds of public or private networks, and third networks such as private fixed networks and other kinds of public or private networks. Examples of such arrangements are networks and parts thereof such as switching centres, servers, switches, routers, forwarders, multiplexers, and other network units.

A prior art method is known in general. To set up a "normal" call from a first subscriber in a first network to a second subscriber in a second network, the first subscriber dials a telephone number of the second subscriber, and in response the first network sets up a part of the "normal" call from the first subscriber to a border between the first and second networks and the second network sets up another part of the "normal" call from the border between the first and second networks to the second subscriber. As soon as the second subscriber has accepted the "normal" call, the first and second subscribers can start a communication with each other. The first subscriber is charged for this call.

To charge the second subscriber for the communication, a "call back" call is to be set up. Thereto, the second subscriber does not accept the "normal" call from the first subscriber, but the "normal" call is only used to inform the second subscriber that the first subscriber would like to communicate. To set up the "call back" call, the second subscriber waits until the first subscriber has ceased the "normal" call and then dials a telephone number of the first subscriber, and in response the second network sets up a part of the "call back" call from the second subscriber to a border between the first and second networks and the first network sets up another part of the "call back" call from the border between the first and second networks to the first subscriber. As soon as the first subscriber has accepted the "call back" call, the first and second subscribers can start a communication with each other. The second subscriber is charged for this call.

The prior art method is disadvantageous, inter alia, in that the first subscriber must start the "normal" call and then cease the "normal" call before the first subscriber can accept the "call back" call from the second subscriber.

It is an object of the invention, inter alia, to provide an improved method for setting up a connection via an interconnection between different networks, from a first subscriber in a first network to a second subscriber in a second network, whereby (mainly) the second subscriber is charged for the connection, without separate "normal" and "call back" connections needing to be set up.

Further objects of the invention are, inter alia, to provide a first module for a first network, a first sub-method for a first network, a second module for a second network, a second sub-method for a second network, a third module for a third network, a third sub-method for a third network, and an arrangement comprising a module.

According to a first aspect of the invention, a first method is provided.
A method for setting up a connection via an interconnection between different networks (1, 2), the method comprising—a first step of, via a first network unit (11) located in a first network (1), setting up a first part of the connection from a first subscriber station to at least the first network unit (11), a first module, located in or connected to the first network, receiving first information, the first information comprising at least part of a first identification of the first subscriber station and at least a part of a second identification of the second subscriber station that is to be called and causing the first part of the connection to be set up to at least the first network unit.

a second step of, in response to the first information being received by the first module (12), sending second information from the first module (12) to a second module (22) in or connected to a second network (2), the second information comprising instructions for the interconnection to be set up from the second network to the first network, thereby causing the charging control of at least the interconnection to take place outside the first network.

a third step of, in response to the second information being received by the second module (22), setting up the interconnection, the interconnection being set up from the second network (2) to the first network (1) via the first network unit, the interconnection being connected to the first part of the connection and, in the second network (2), setting up a second part of the connection to the second subscriber station a fourth step of connecting the second part of the connection to the interconnection The first part of the connection can terminate at the first network unit (11) or at a further unit, such as the first module (12). In the latter case, the first part of the connection will be set up via the first network unit (11).

As exemplified by the two following embodiments, the sending of second information to the second module (22) can be done in the process of performing an ordinary, temporary call attempt, in which a temporary call leg is set up. This temporary call attempt is initiated by the first module and treated by the first network unit no different from a normal call attempt.

Another embodiment of the method is further defined.
Preferably in the second step, in response to the first information being received by the first module (12), a temporary call leg from the first network (1) to the second network (2) is set up (the temporary call attempt).

in the third step, the temporary call leg is released in the second network (2)

Another embodiment of the method is furhter defined.
Preferably the second information is sent to the second module (22) during the set up of the temporary call leg Another embodiment of the method is further defined.
Preferably the second information comprises a second identification of a second subscriber station, this second identification being different from the second identification of the second subscriber station comprised in the first information, the first module (12) determining said second identification comprised in the second information, based on the first information received.

Another embodiment of the method is further defined. Preferably the second information also comprises a correlation ID, determined by module (12) in response to the receipt of the first information whereby the correlation ID can optionally be used by the second network to route second information to the second module (22)

whereby the correlation ID is sent back from the second network to the first network during the set up of the interconnection whereby the returned correlation ID is analysed, resulting in the interconnection being connected to the first part of the connection.

According to a second aspect of the invention, a second method is provided.

In a first network such as for example a public fixed network (first step), first information is received, which first information defines at least a first part of the connection within the first network. The first information arrives for example at a first network unit and originates for example from a first subscriber station possibly via a further first network unit and comprises for example at least a part of a first identification of the first subscriber station via which the connection has been initiated and at least a part of a second identification of the second subscriber station that is to be called. According to a first option, the second identification of the second subscriber station is such that this second identification further defines that the charging control of at least the interconnection is not to be performed by the first network but that it is to be performed by another network. A possible way to realize this is by giving the second subscriber station two telephone numbers, one for being called via "normal" connections and one other for being called via "call back" connections, without having excluded other options. According to a second option, the second identification of the second subscriber station is a "normal" identification, whereby in or near the first network a conversion is to be made for converting the "normal" identification into a "call back" identification. A possible way to realize this is by introducing a database in or near the first network that for example in dependence of a user setting (such as a user preference etc.) or another parameter (such as a time, a date etc.) makes the conversion, without having excluded other options. The first part of the connection is for example a first leg between the first subscriber station and the first network unit or between the further first network unit and the first network unit. Before the first information is received by the first network unit, while the first information is being received by the first network unit, or after the first information has been received by the first network unit, the first part of the connection is for example set up and is for example kept open, without having excluded other options.

In response to the reception of the first information (second step), second information is sent to a second network such as for example a public mobile network, which second information defines the charging control of at least the interconnection to be performed outside the first network and defines at least a second part of the connection. The second information originates for example from the first network unit when comprising a first module or originates for example from the first module when being coupled to the first network unit and may be identical to the first information or may be partly or entirely different from the first information. The second information comprises for example at least a part of the first identification of the first subscriber station or comprises for example a link to this first identification of the first subscriber station or comprises for example a link to the first information and comprises at least a part of the second identification of the second subscriber station (which second identification may further be used as one or more of the links mentioned before). The second identification of the second subscriber station may be or may not be such that this second identification further defines that the charging control of at least the interconnection is not to be performed by the first network but that it is to be performed by another network.

In the second network (third step), in response to a reception of the second information, the second part of the connection is set up within the second network. The second information arrives for example at a second network unit when comprising a second module or arrives for example at the second module when being coupled to the second network unit. The second part of the connection is for example a second leg between the second network unit and the second subscriber station or between the second network unit and a further second network unit via which the second subscriber station can communicate. The connection comprises the first part, the interconnection and the second part. The interconnection is for example an interconnecting leg between the second network unit and the first network unit and forms a coupling between the second part and the first part such that the first and second subscriber stations can communicate. The setting up of the first part, the interconnection and the second part may be performed in this particular order or according to another sequence.

This way, a "call back" call can be set up without a "normal" call needing to precede this "call back" call.

Another embodiment of the method is further defined. Preferably, the charging control of at least the interconnection is performed by/inside the second network and/or a connection control of at least the interconnection is performed by/inside the second network.

Another embodiment of the method is further defined. Possibly, a third network may be involved, such as a private fixed network.

In response to the reception of the first information (first sub-step of the second step), third information is sent to a third network. The third information arrives for example at a third network unit and originates for example from the first network unit and comprises for example at least a part of the first identification of the first subscriber station via which the connection has been initiated or comprises for example a pointer to this first identification of the first subscriber station or comprises for example a pointer to the first information and comprises for example either at least a part of the second identification of the second subscriber station that is to be called or at least a part of a third identification of a third subscriber station that is to be called. The second identification of the second subscriber station may be or may not be such that this second identification further defines that the charging control of at least the interconnection is not to be performed by the first network but that it is to be performed by another network.

In response to a reception of the third information (second sub-step of the second step), the second information is sent to the second network. The second information originates for example from the third network unit when comprising a third module or originates for example from the third module when being coupled to the third network unit and may be identical to the third information or may be partly or entirely different from the third information.

According to a first possibility (call forwarding), the third network has forwarded the call to the second network. According to a second possibility (parallel ringing), the second and third network will perform "parallel ringing", as follows, and without having excluded further possibilities.

In the third network, in response to a reception of the third information, a third part of the connection may be set up within the third network. The third part of the connection is for example a third leg between the third network unit and the third subscriber station and may be for example set up to realize "parallel ringing" at the second and third subscriber stations to for example allow the second subscriber to choose between answering the call via the second or the third subscriber station. The connection may further comprise a further interconnection between the first and third networks and the third part. The further interconnection is for example a further interconnecting leg between the third network unit and the first network unit. Alternatively, in this case, the interconnection may be present between the second and third network units, such as an interconnecting leg between these second and third network units. In that case, the first network is only used for coupling the first subscriber station to the third network, and the third network contacts the second network and the interconnection is present between the second and third networks whereby the second network gets the charging control of at least this interconnection between the second and the third network etc.

This way, a "call back" call can be set up without a "normal" call needing to precede this "call back" call, and the second subscriber has the option of using the second subscriber station for realizing a communication via a "call back" call or the third subscriber station for realizing a communication via a "normal" call.

According to a third aspect of the invention, a first module for a first network is provided.

According to a fourth aspect of the invention, a first sub-method for a first network is provided.

According to a fifth aspect of the invention, a second module for a second network is provided.

According to a sixth aspect of the invention, a second sub-method for a second network is provided.

According to a seventh aspect of the invention, a third module for a third network is provided.

According to an eighth aspect of the invention, a third sub-method for a third network is provided.

According to a ninth aspect of the invention, an arrangement comprising a module is provided.

Embodiments of the modules according to the invention and of the sub-methods according to the invention and of the arrangement according to the invention correspond with the embodiments of the method according to the invention.

An insight may be that a prior art call back procedure based on separate "normal" and "call back" calls is relatively user unfriendly. A basic idea may be that a call back procedure should be based on one integrated connection comprising a "normal" part and a "call back" part.

A problem to provide a method for setting up a connection via an interconnection between different networks, from a first subscriber in a first network to a second subscriber in a second network, whereby for example the network operator of the second network has the charging control of the interconnection between the networks and (mainly) the second subscriber can be charged for the connection, without separate "normal" and "call back" calls needing to be set up, is solved.

An aspect of the invention that can be understood from the above is that, when the invention is applied to a first network connected to a second network by an interconnection, the first network unit will essentially perform the same operations, as that it would perform during normal call set-ups. Hence an operator of the first network, that does not also operate the first module 12, does, from a technical point of view, not have to be consciously aware of the appliance of the invention.

A further consequence of the invention is that, when it is applied, the user of the first subscriber station when initiating a new call, will, if not informed previously, not notice that the invention is applied. The reason for this being that the number used during the above call set up, would typically not be distinct from an ordinary number, and not be recognisable as a number specifically used for the carrying out of the invention.

A further advantage may be that an introduction of a new service has become possible.

These and other aspects of the invention are apparent from and will be further elucidated with reference to the embodiments described hereinafter.

Figure 1:
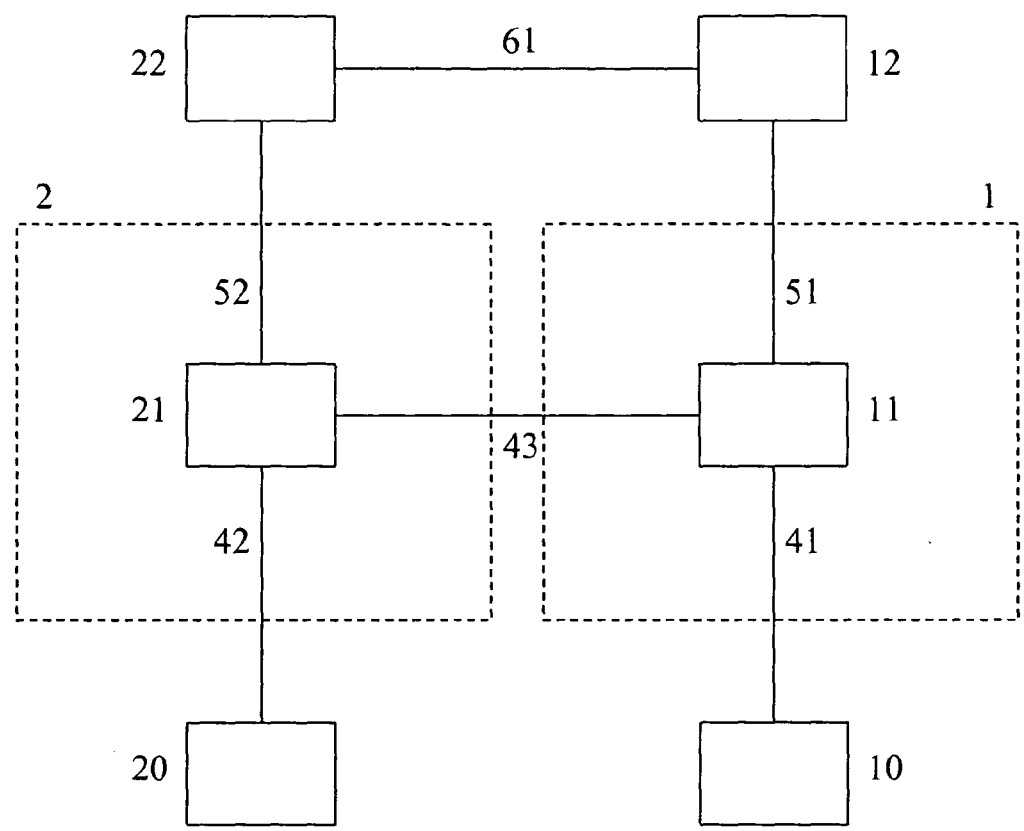
FIG. 1 shows a first schematic diagram of a first situation according to the invention.

In the FIG. 1, a first network 1 is shown such as a public fixed network or another public or private network. The first network 1 comprises a first network unit 11 coupled to a first subscriber station 10 via a coupling 41 and coupled to a first module 12 via a coupling 51. Further, a second network 2 is shown such as a public mobile network or another public or private network. The second network 2 comprises a second network unit 21 coupled to a second subscriber station 20 via a coupling 42 and coupled to a second module 22 via a coupling 52. The first and second network units 11 and 21 are coupled to each other via a coupling 43. The first and second modules 12 and 22 are coupled to each other via a coupling 61. The network units 11 and 21 for example each comprise a switch, a router, a forwarder, a multiplexer, a server etc.

A first subscriber who wants to communicate with a second subscriber via a "normal" connection (in for example a prior art non Intelligent Network environment) takes the first subscriber station 10 and dials a "real" number of the second subscriber station 20. In response, a "normal" connection is set up from the first subscriber station 10 via the coupling 41 and the network unit 11 and the coupling 43 and the network unit 21 and the coupling 42 to the second subscriber station 20. The first subscriber is charged for this "normal" connection.

A first subscriber who wants to communicate with a second subscriber via a "call back" connection (according to a first option of the invention) takes the first subscriber station 10 and dials for example a "virtual" number of the second subscriber station 20. This "virtual" number is different from the "real" number of the second subscriber station 20. In response, the first network unit 11 collects first information. The first information comprises at least a part of a first identification of the first subscriber station 10 via which the connection has been initiated, such as for example a telephone number of the first subscriber station 10. This way, at least a first part of the connection is defined. This first part for example corresponds with the coupling 41. The first information further comprises at least a part of a second identification of the second subscriber station 20 that is to be called, such as for example the "virtual" number of the second subscriber station 20. This way, it is defined that a charging control of at least an interconnection between the first and second networks 1 and 2 is to be performed outside the first network 1, such as for example inside the second network 2. Before the first information is received by the first network unit 11, while the first information is being received by the first network unit 11, or after the first information has been received by the first network unit 11, the first part of the connection is for example set up and is for example kept open, without having excluded other options.

The first network unit 11 sends the first information to the first module 12 via the coupling 51. In response, the first module 12 sends second information to the second module 22, for example via the coupling 61, such as a data connection, or via the couplings 51, 43 and 52. The second information may be identical to the first information or may be partly or entirely different from the first information. When partly or entirely different, the first module 12 may take care of a conversion. The second information comprises for example at least a part of the first identification of the first subscriber station 10 via which the connection has been initiated, such as for example the telephone number of the first subscriber station 10, or comprises for example a link to this first identification of the first subscriber station 10 or comprises for example a link to the first information. The second information further comprises at least a part of the second identification of the second subscriber station 20 that is to be called, such as for example the "real" number of the second subscriber station 20, whereby for example the first module 12 has converted the "virtual" number of the second subscriber station 20 into the "real" number of this second subscriber station 20 (which second identification may further be used as one or more of the links mentioned before). This way, it is defined that the charging control of at least the interconnection is to be performed outside the first network 1, such as for example inside the second network 2. The (parts of the) first (if available) and second identifications of the first and second subscriber stations 10 and 20 further define a second part of the connection, such as for example the coupling 42.

The second module 22 receives the second information and in response sends a set up instruction to the second network unit 21. The second network unit 21 in response sets up the second part of the connection within the second network. This second part of the connection for example corresponds with the coupling 42. The connection comprises the first part, the interconnection and the second part. The interconnection for example corresponds with the coupling 43 and forms a coupling between the second part and the first part such that the first and second subscriber stations 10 and 20 can communicate. The setting up of the first part, the interconnection and the second part may be performed in this particular order or according to another sequence. As a result, a "call back" call has been set up without a "normal" call needing to precede this "call back" call.

A first subscriber who wants to communicate with a second subscriber via a connection (according to a second option of the invention) takes the first subscriber station 10 and dials for example a "real" number of the second subscriber station 20. In response, the first network unit 11 collects first information. The first information comprises at least a part of a first identification of the first subscriber station 10 via which the connection has been initiated, such as for example a telephone number of the first subscriber station 10. This way, at least a first part of the connection is defined. This first part for example corresponds with the coupling 41. The first information further comprises at least a part of a second identification of the second subscriber station 20 that is to be called, such as for example the "real" number of the second subscriber station 20. Before the first information is received by the first network unit 11, while the first information is being received by the first network unit 11, or after the first information has been received by the first network unit 11, the first part of the connection is for example set up and is for example kept open, without having excluded other options.

But this time, in or near the first network 1, a conversion is to be made for converting the "real" number or another "dialed" number into a "virtual" number. A possible way to realize this is by introducing a database or an application in or near the first network 1 that for example in dependence of a user setting (such as a user preference etc.) or another parameter (such as a time, a date etc.) makes the conversion, without having excluded other options. This database may partly or entirely form part of the first network unit 11, or not. Via the "virtual" number, it is defined that a charging control of at least an interconnection between the first and second networks 1 and 2 is to be performed outside the first network 1, such as for example inside the second network 2.

The first network unit 11 sends the converted first information to the first module 12 via the coupling 51 or, in case of the database or the application partly or entirely forming part of the first module 12, the first network unit 11 sends the first information to the first module 12 for being converted. In response, the first module 12 sends second information to the second module 22, for example via the coupling 61, such as a data connection, or via the couplings 51, 43 and 52. The second information may be identical to the first information or may be partly or entirely different from the first information. When partly or entirely different, the first module 12 may take care of a conversion. The second information comprises at least a part of the first identification of the first subscriber station 10 (if available) via which the connection has been initiated, such as for example the telephone number of the first subscriber station 10, or comprises for example a link to this first identification of the first subscriber station 10 or comprises for example a link to the first information. The second information further comprises at least a part of the second identification of the second subscriber station 20 that is to be called, such as for example the "real" number of the second subscriber station 20, whereby for example the database or the application has converted the "dialed" number into the "virtual" number and whereby the first module 12 has converted the "virtual" number of the second subscriber station 20 into the "real" number of this second subscriber station 20. Alternatively, the second information may comprise for example the "virtual" number of the second subscriber station 20, whereby for example the second module 22 will take care of a conversion of this "virtual" number into the "real" number of the second subscriber station 20 (which second identification may further be used as one or more of the links mentioned before). This way, it is defined that the charging control of at least the interconnection is to be performed outside the first network 1, such as for example inside the second network 2. The (parts of the) first (if available) and second identifications of the first and second subscriber stations 10 and 20 further define a second part of the connection, such as for example the coupling 42.

The second module 22 receives the second information etc. as described above for the first option.

Any operation performed in one of the modules 12 and 22 may be shifted into the other one, without departing from the scope of this invention. Instead of using "real" numbers and "virtual" numbers, other kinds of numbers may be used, and/or other kinds of indications and/or definitions may be used, etc.

So, the invention provides features for an automatic and user hidden call back procedure based on a network centric solution. It is a converged network solution because the features may need to be supported by both networks at a functional and an administration layer. Due to the network centric character of the solution additional features do not need to be implemented in the telephone equipment and a specific manual handling necessary from the users point of view is not required.

The invention may be beneficial for groups of people (staff of company, families) with a common budget or account whereby members of the group use telephone sets accessed to different types of networks, individual users of the second network, who want to avoid high communication costs for communication partners calling from external networks, and the network or service operator of the second network who wants to have the full call and charging control of terminating calls initiated in external networks.

With the features the network or service operator is in a position to offer specific and high sophisticated telecommunication services.

In view of the FIG. 1, the first and second modules 12 and 22 can be applications on top of an SCP (Service Control Point) following an IN (Intelligent Network) recommendation, on top of the CSE (CAMEL Service Environment) following a CAMEL (Customized Application for Mobile Enhanced Logic) recommendation, on top of a SN (Service Node) connected via e.g. ISUP (ISDN User Part) protocol, on top of an OSA Application Server or can be applications integrated in the network units 11 and 21. Further, SIP (Session Initiated Protocol) equipment, VoIP equipment and IP equipment and further equipment are not to be excluded either.

The second subscriber of the second network 2 uses the second subscriber station 20 and has a dedicated mobile number (a "real" number) e.g. +49 177 448 788 which addresses the second subscriber station 20 and a "virtual fix net number" (a "virtual" number) e.g. +49 211 232323 which for example belongs to the number range of the network operator of the first network 1. This virtual fix net number has no physical termination in the first network 1. Calls to this number will be routed to the second network 2 and terminate to a mobile number. The idea of the service "virtual fix net number" is that the second subscriber communicates a "virtual fix net number" but receives the calls to this number at the second subscriber station 20 and the invention takes care that the operator of the second network 2 controls the calls and the charging for the call leg between the second network 2 and the first network 1.

In view of the FIG. 1, an exemplary high level architecture for an applicable scenario might be as follows, without excluding alternatives:

the first subscriber wants to communicate with the second subscriber via phone and dials the "virtual fix net number" of the second subscriber at the first subscriber station 10 such as a telephone set, the dialed digits are transferred to the first network unit 11 such as a fixed net switching centre, the first network unit 11 routes the call to the first module 12 and the first module 12 (in this example module 12 acts as a Service Node) receives the call attempt from the first subscriber (via a first channel of the coupling 51), in the first module 12 the "virtual fix net number" and the mobile number of the second subscriber are administrated in a way that the application of this first module 12 can identify the mobile number of the second subscriber who has subscripted the "virtual fix net number" service, and the first module 12 generates a correlation ID, which identifies this dedicated call, the first module 12 routes the call ("Initial Address Message") to the second mobile network 2 via the first network unit 11 (via a second channel of the coupling 51 and via a first channel of the coupling 43 in the FIG. 1), the correlation ID and the mobile number of the second subscriber and the number of the first subscriber are combined by the first module 12 and a combination is transported via signaling protocols such as ISUP using Initial Address Message to the second network unit 21 such as a mobile switching centre in the second network 2, the second network unit 21 triggers and invokes the second module 22 using the INAP or the CAMEL protocol (via a first channel of the coupling 52 in the FIG. 1), the second network unit 21 takes care of the transfer of the correlation ID, the mobile number of the second subscriber and the number of the first subscriber to the second module 22, the second module 22 recognizes the call attempt based on the correlation ID and fetches the call parameters but the call attempt is not accepted, the second module 22 instructs the second network unit 21 by using the INAP or CAMEL protocol to release the call (via the first channel of the coupling 43 and the second channel of the coupling 51) to the first module 12, but the first channel of the coupling 51 and the coupling 41 are still active, the second module 22 instructs the second network unit 21 by using the INAP or CAMEL protocol to establish a call leg back to the first module 12 (via a second channel of the coupling 43 and a third channel of the coupling 51 in the FIG. 1), the correlation ID is transported to the first module 12 via the first network unit 11 using e.g. the ISUP protocol, the first module 12 can identify the specific call scenario by analyzing the correlation ID, the first module 12 accepts the incoming call leg by sending a response message back to the second network unit 21 via the first network unit 11 and interconnects the call leg of the new incoming call from the second network unit 21 with the call leg of the first subscriber station 10, and the second network unit 21 informs the second module 22 by using the INAP or CAMEL protocol, that the call was answered by the first module 12, the second module 22 instructs the second network unit 21 by using the INAP or CAMEL protocol to establish another call leg to the second subscriber station 20 of the second subscriber (coupling 42) and further instructs the second network unit 21 to interconnect the new call leg to the second subscriber 20 with the call leg to the first module 12 and the first and second subscriber can start communication, when the call is answered by the second subscriber station 20 of the second subscriber, and the second network unit 21 of the second network 2 generates a Call Data Record for the interconnection (coupling 43) between the network 2 and 1 as a basis for preparing a bill for the second subscriber.

Instead of routing the call by using the signaling capability of the networks typically based on the ISUP protocol, the first module 12 may communicate with the second module 22 directly via a data connection (coupling 61 e.g. Internet, GPRS . . . ) using an appropriate IT protocol. The parameter needed for the "call back" call e.g. the correlation ID and the numbers of the first and second subscribers have to be transferred from the first module 12 to the second module 22. Further, the correlation ID is an exemplary embodiment only and may be replaced by other numbers, indications, definitions etc.

Figure 2:
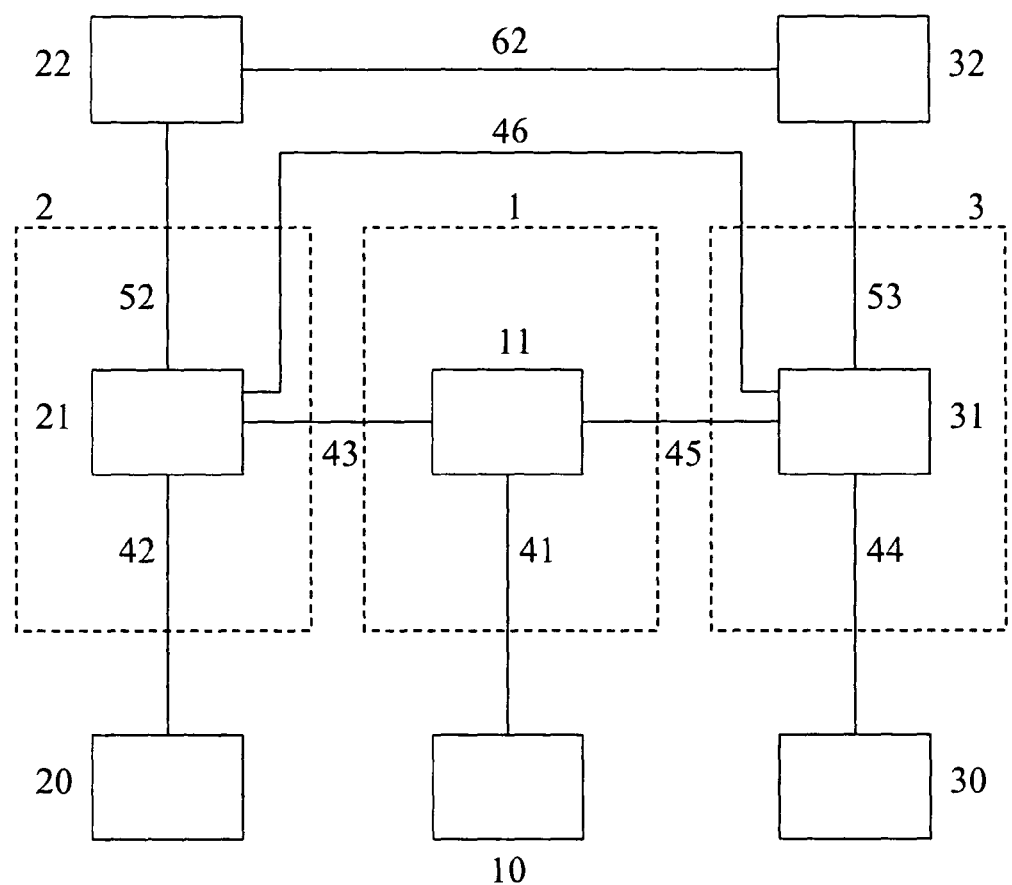
FIG. 2 shows a second schematic diagram of a second situation according to the invention.

In the FIG. 2, a first network 1 is shown such as a public fixed network or another public or private network. The first network 1 comprises a first network unit 11 coupled to a first subscriber station 10 via a coupling 41. Further, a second network 2 is shown such as a public mobile network or another public or private network. The second network 2 comprises a second network unit 21 coupled to a second subscriber station 20 via a coupling 42 and coupled to a second module 22 via a coupling 52. The first and second network units 11 and 21 are coupled to each other via a coupling 43. Further, a third network 3 is shown such as a private fixed network or another public or private network. The third network 3 comprises a third network unit 31 coupled to a third subscriber station 30 via a coupling 44 and coupled to a third module 32 via a coupling 53. The first and third network units 11 and 31 are coupled to each other via a coupling 45. The second and third network units 21 and 31 are coupled to each other via a coupling 46. The second and third modules 22 and 32 are coupled to each other via a coupling 62. The network units 11, 21 and 31 for example each comprise a switch, a router, a forwarder, a multiplexer, a server etc.

In view of the FIG. 2, the second module 22 can be an application on top of an SCP (Service Control Point) following the IN (Intelligent Network) recommendation, on top of the CSE (CAMEL Service Environment) following the CAMEL (Customized Application for Mobile Enhanced Logic) recommendation, on top of a SN (Service Node) connected via e.g. ISUP (ISDN User Part), on top of an OSA Application Server protocol or can be an application integrated in the second network unit 21 of the second network 2. The third module 32 can be an application on top of a separate system connected to the third network unit 31 or the third module 32 can be fully or partly integrated in the third network unit 31. Further, SIP (Session Initiated Protocol) equipment, VoIP equipment and IP equipment and further equipment are not to be excluded either.

The second subscriber uses two subscriber stations 20 and 30 in the second network 2 and in the third network 3. The third subscriber station 30 can be a fix net telephone set or a IP telephone set served by the third network unit 31. The idea of this combination is that the second subscriber is reachable under one number (typically the number of the third subscriber station 30). In case of an incoming call this combination ensures that the second and third subscriber stations 20 and 30 are ringing in parallel and the second subscriber has the choice to receive the call at one of them. The invention takes care that the operator of the second network 2 controls the calls and the charging for the call legs between the second network 2 and the first network 1, in case the second subscriber is receiving the call via the second subscriber station 20.

In view of the FIG. 2, an exemplary high level architecture for an applicable scenario might be as follows, without excluding alternatives:

the first subscriber wants to communicate with the second subscriber and the first subscriber dials the number of the third subscriber station 30 using e.g. the first subscriber station 10 served by the first network 1, the dialed digits are transferred to the first network unit 11 such as a fixed net switching centre of the first network 1, the call is routed by the first network unit 11 to the third network unit 31 in the third network 3 (via a first channel of the coupling 45), the third network unit 31 is configured in a way that the call is routed to the third module 32 and this third module 32 receives the call attempt from the first subscriber (via a first channel of the coupling 53), and the third network unit 31 starts a call attempt to the third subscriber station 30 (via the coupling 44), the third module 32 in combination with the third network unit 31 starts a call attempt (Temporary Call Attempt) to the second network 2 (via second channels of the couplings 53 and 45 and via a first channel of the coupling 43), in the signaling of the temporary call attempt to the second network 2, a correlation ID, which identifies this dedicated call, generated by the third module 32, and the numbers of the first, if available and second subscribers are included using e.g. the QSIG protocol in a private network and ISUP in a public networks, the second network unit 21 triggers and invokes the second module 22 using the INAP or the CAMEL protocol (via a first channel of the coupling 52), the second network unit 21 takes care for the transfer of the parameters such as the correlation ID and the numbers of the first, if available and second subscribers to the second module 22, the second module 22 recognizes the temporary call attempt and fetches the call parameters but the call attempt is not accepted, the second module 22 instructs the second network unit 21 (via a second channel of the by using the INAP or CAMEL protocol to release the call (the first channel of the coupling 43 and the second channels of the couplings 45 and 53) to the third module 32, but the first channels of the couplings 53 and 45 and the coupling 41 are still active, the second module 22 instructs (via the second channel of the coupling 52) the second network unit 21 by using the INAP or CAMEL protocol to establish a call leg back to the third module 32 (via a second channel of the coupling 43 and via a second channel of the coupling 45 and via a third channel of the coupling 53), the correlation ID is transported to the third module 32 via the first network unit 11 using e.g. the ISUP protocol in a public network and via the third network unit 31 using e.g. QSIG in a private network, the third module 32 can identify the specific call scenario by analyzing the correlation ID, the third module 32 accepts the incoming call leg by sending a response message back to the second network unit 21 via the first network unit 11 and third network unit 31 and interconnects the call leg of the new incoming call from the second network unit 21 with the call leg of the first subscriber station 10 via the third network unit 31, and the second network unit 21 informs the second module 22 by using the INAP or CAMEL protocol, that the call was answered by the third module 32, the second module 22 instructs the second network unit 21 by using the INAP or CAMEL protocol to establish another call leg to the second subscriber station 20 of the second subscriber (coupling 42) and further instructs the second network unit 21 to interconnect the new call leg to the second subscriber 20 with the call leg to the third module 32, and in this stage the involved modules and systems take care for the parallel ringing at the second and third subscriber stations 20 and 30, if the second subscriber station 20 takes the call the third network unit 31 releases the call leg to the third subscriber station 30 and the first and second subscribers can start the communication, the second network unit 21 of the second network 2 generates a Call Data Record for the interconnection (coupling 43) between the network 2 and 1 as a basis for preparing a bill for the second subscriber.

Instead of routing the call by using the signaling capability of the networks typically based on the ISUP protocol respectively the QSIG protocol, the third module 32 may communicate with the second module 22 directly via a data connection (coupling 62 e.g. Internet, GPRS . . . ) using an appropriate IT protocol. The parameter needed for the "call back" call e.g. the correlation ID, the number of the called party (the second subscriber) and the number of the caller (the first subscriber) have to be transferred from the third module 32 to the second module 22. Further, the correlation ID is an exemplary embodiment only and may be replaced by other numbers, indications, definitions etc.

Alternatively, the interconnection is realized via a more direct connection between the second and third network units 21 and 31 (coupling 46), whereby the first network 1 is only used to couple the first subscriber station 10 to the third network unit 31 etc.

Further alternatively, instead of realizing "parallel ringing", the third and second networks 3 and 2 may be used for realizing "call forwarding" from the third network 3 to the second network 2, without any "parallel ringing" taking place and without the third subscriber station 30 being involved.

For example, if the second subscriber station 20 belongs to the same company that pays for calls via the unit 31 (typically a PBX) and a price "y per minute" for calling from the second network 2 to the first network is lower than the price "x per minute" for calling from the first network 1 to the second network 2, the company will safe money for the communications.

Figure 3:
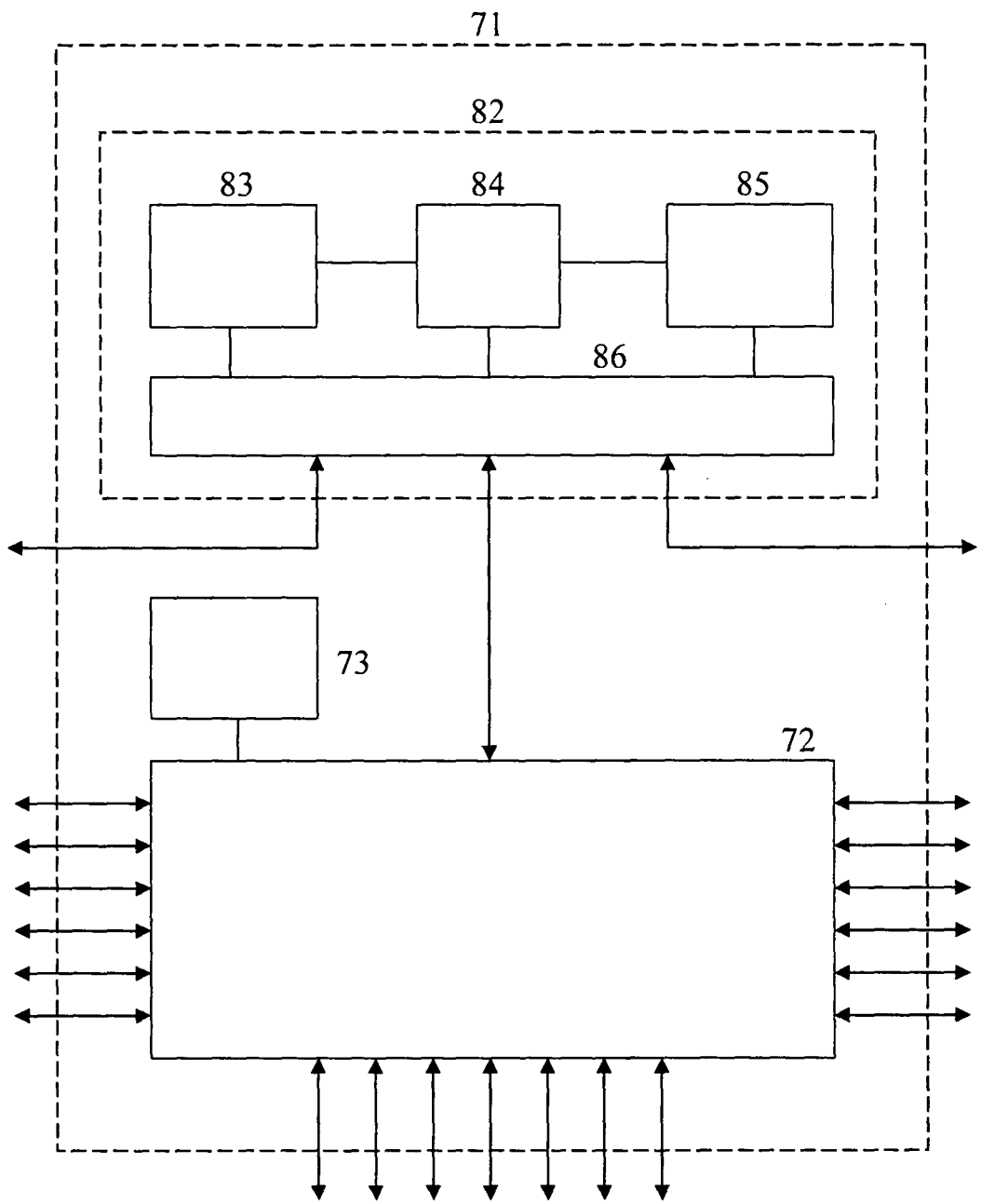
FIG. 3 shows a third schematic diagram of an arrangement according to the invention comprising a module according to the invention.

In the FIG. 3, an arrangement 71 according to the invention is shown comprising a module 82 according to the invention. The arrangement 71 for example corresponds with a network or with a part thereof such as a network unit 11, 21 or 31 such as switches, routers, forwarders, multiplexers, servers etc. The module 82 for example corresponds with one of the first, second and third modules 12, 22 and 32.

The arrangement 71 comprises for example a switch 72 coupled to a controller 73 and to an interface 86 of the module 82. The module 82 further comprises for example a receiver 83, a controller 84 and a sender 85 all coupled to the interface 86. The controller 84 is further coupled to the receiver 83 and the sender 85. Alternatively, the module 82 may be located outside the arrangement 71. The controllers 73 and 84 may comprise storages and may comprise detectors for detecting incoming signals and generators for generating outgoing signals and converters for converting signals etc. all not shown. The term "signal" may be "information", "instruction" etc.

So, preferably, a charging control of (the interconnection between the different networks 1,2 or 2,3 of) the call may be performed inside the second network 2 and/or a call control of (the interconnection between the different networks 1,2 or 2,3 of) the call may be performed inside the second network 2. This does however not exclude the possibility that the first subscriber is also billed for the "call back" call, such as billing this first subscriber for a fixed amount per call or such as billing the first subscriber for a smaller part of the bill whereby the second subscriber is billed for a larger part of this bill.

The first and second subscribers are in the FIGS. 1 and 2 coupled directly to the first and second and third networks 1, 2 and 3. It is however not to be excluded that a subscriber is coupled indirectly to a network, for example via a further network such as a Voice over Internet Protocol or VoIP network. In that case, the blocks 10, 20 and/or 30 may represent gateways such as VoIP gateways etc. Each network may comprise two or more sub-networks, each coupling may be a wired or wireless coupling and may comprise two or more sub-couplings and/or one or more network units, without departing from the scope of this invention. The second and third subscriber stations 20 and 30 might form part of one physical subscriber station comprising different transceivers, and each subscriber station 10, 20, 30 may be of any kind. Each piece of the invention may be divided into two or more smaller pieces, and two or more pieces of the invention may be combined into a larger piece, without departing from the scope of this invention.

Summarizing, to set up connections via interconnections between different networks 1, 2 or 2, 3 in first networks 1 e.g. public fixed networks (first step), first information is received defining at least first parts of the connections within the first networks 1. In response, (second step) second information is sent to second networks 2 e.g. public mobile networks defining the charging control of at least the interconnections to be performed outside the first networks 1 and defining at least second parts of the connections. In response, (third step) the second parts of the connections are set up within the second networks 2. The connections comprise the first parts, the interconnections and the second parts. This way, "call back" calls can be set up without "normal" calls needing to precede these "call back" calls. Further exemplary embodiments of the invention are detailed below.

Frequently, nowadays, a customer has a subscription with a mobile network operator for his mobile device and a subscription with a fixed net operator for his fixed line. In a common situation, forwarding of calls from his fixed line to his mobile line are relatively more expensive, then calling to a fixed number, due to the higher termination fee to terminate a call in a mobile network relative to terminating a call in a fixed network. Further a calling party would rather prefer to call a fixed line than a mobile number for the same reason. Also, there are a lot of countries, where the asymmetrical termination fees between fixed and mobile networks are regulated. The network operators are not able to avoid these regulated prices, in order to get more flexibility of charging the customer.

The invention deals with the above mentioned issues, and thus can be beneficial for several (different) parties. One of the possible benefits of this invention is, that a user could cancel his contract for the fixed line (which could save money for him), and still be reachable under his original fixed net number, because he can have the number 'ported' to for example another (virtual) fixed network operator, partnered to the mobile network operator. Applying the invention, the user can be reached on his mobile without paying the high termination fee for terminating in a mobile network, because instead of forwarding the call, the call direction of the interconnection is reversed, hence avoiding the termination fee for terminating in a mobile network. Instead the call is terminated in the fixed network and the termination fee for terminating in a fixed network is in most cases lower.

Further the calling party will profit from this invention, because he is able to reach the mobile subscriber by dialing the original fixed net number, which is much cheaper for him to call. Last but not least, the mobile network operator is able to retrieve more incoming traffic, because calls to a fixed number, which would previously only make use of the fixed network are now also using his mobile network. Furthermore the mobile network operator gets the call and charging control of the interconnection between the mobile and the fixed network and can charge the mobile subscriber a fee.

Figure 4:
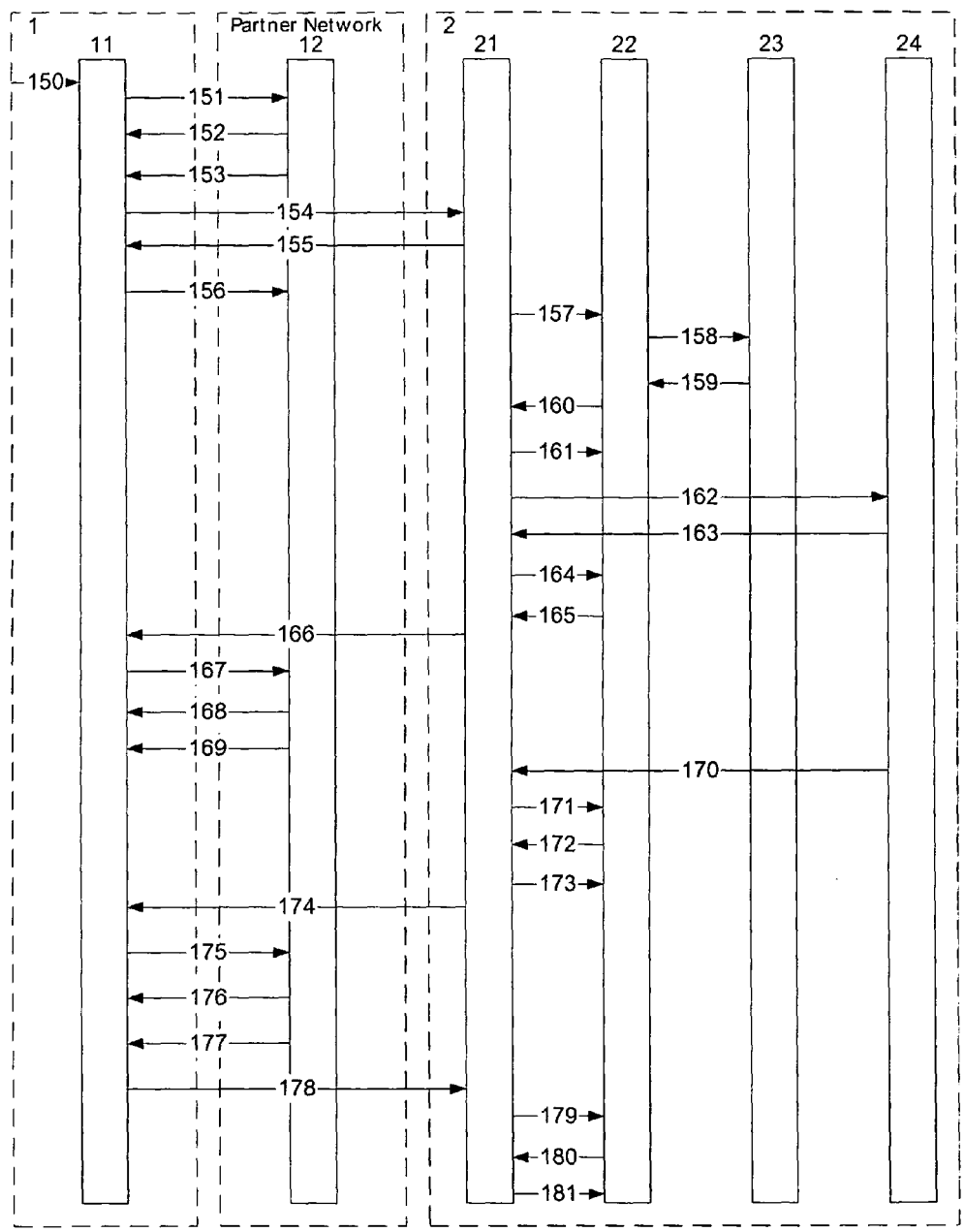
FIG. 4 shows a schematic diagram of an exemplary call flow.
Figure 5:
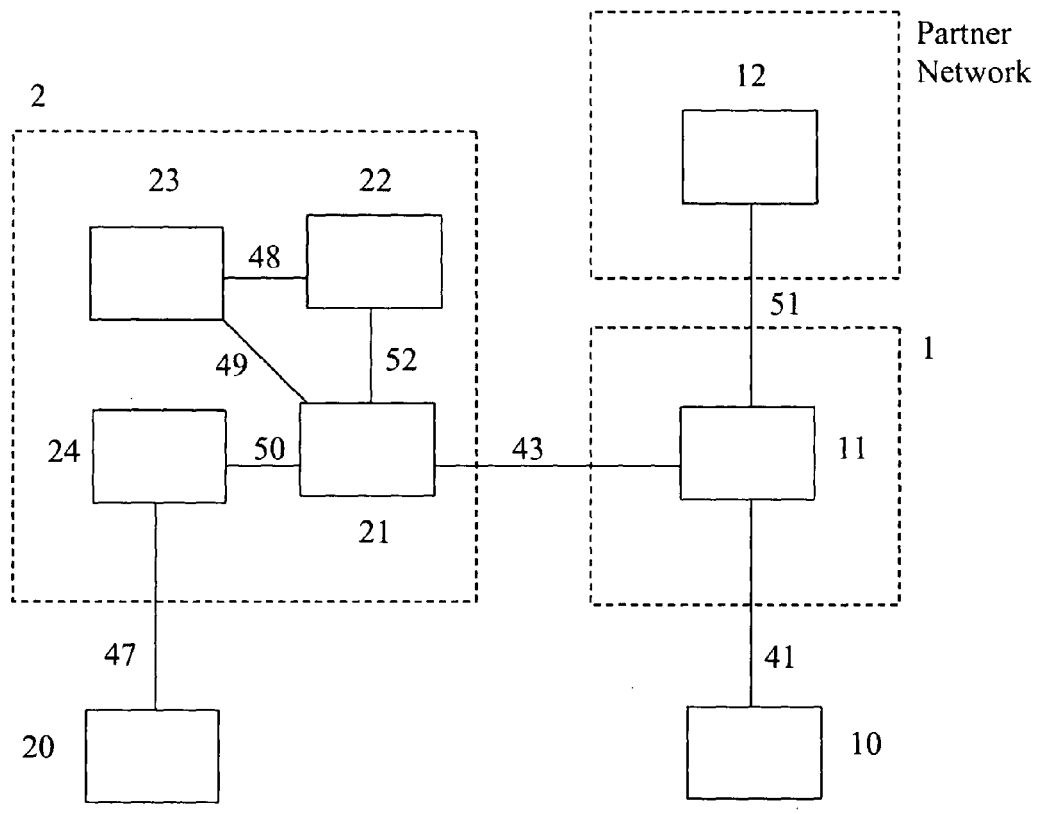
FIG. 5 shows a schematic of a high level architecture of example networks.

The call flow applicable when the invention is for example used in setting, is further detailed below, with reference to FIG. 4 (diagram of an exemplary call flow) and FIG. 5. (high level architecture).

The user, who initiates the communication, uses the terminal 10 (the first subscriber station) connected to the network 1 (the first network). In this example network 1 and the partner network shown in FIG. 5. are both fixed networks supporting the SS7 protocol, the first network unit 11 is a Fixed Switching Center (FSC), the terminal 10 is a fixed telephone set and the module 12 is a Service Node (SN) within the partner network. The virtual fixed net number of terminal 20 belongs to the number range of the partner network.

In this example the network 2 (the second network) is a mobile network following the GSM or UMTS standard and is interconnected with network 1 (the first network), which is a fixed network. There could be a direct interconnection between the network 2 (the second network) and the partner network, but in this example the connection between both networks has to be supported by the network 1 (first network) as a transit network. The second network unit 21 is a Gateway Mobile Switching Center (GMSC), which is coupled by the coupling 52 with the module 22, which is a Service Control Point (SCP). The module 23 is a Home Location Register (HLR) which is coupled by the coupling 48 with the SCP and is coupled by the coupling 49 with GMSC. The module 24 is the Visited Mobile Switching Center (VMSC), which is coupled by the coupling 47 with the GSM mobile (second subscriber station 20), and is coupled by the coupling 50 with the GMSC.

The first subscriber station (10) belongs to a fixed network (first network 1), with fixed network number, e.g. +492114444444 and the second subscriber station (20) belongs to a GSM network (second network 2), with e.g. MSISDN=+491771234567. Further, the second subscriber station (20) has subscribed to a virtual fixed network number, e.g. +495555555555. This number looks like any normal fixed network number and belongs to the number range of the fixed network (partner network). Virtual fixed network number means here, that just the fixed network number is used, but without having a dedicated terminal in the fixed network (partner network).

Now, the first subscriber station (10) starts calling the second subscriber station (20) by dialing the virtual fixed network number +495555555555, and the call setup 150 is received by the Fixed Switching Center (FSC) of the fixed network (first network 1). The FSC analyses the dialed number and routes the call without any special number handling in a normal way to the partner network by sending an ISUP_InitialAddress-Message (IAM) 151 (first information) to the SN. This ISUP_IAM message (first information) includes at least the CalledPartyNumber (CDP)=+495555555555 and the CallingPartyNumber (CGP)=+492114444444. The SN responds with an ISUP_AddressCompleteMessage (ACM) 152 to the FSC to establish and to hold the call leg to the first subscriber station (10) (first part of the connection). Now, the SN starts checking the CDP=+495555555555 of the first information by querying a database, whether this CDP belongs to a virtual fixed network number service and how to convert this CDP into the GSM number MSISDN=+491771234567 of the second subscriber station (20). Further, the SN checks the CGP of the first information, based on the database query, whether the CGP is allowed to call the second subscriber station (20), by using the virtual fixed network number +495555555555.

In case the CDP does not exist in the database or the CGP is not allowed to call the second subscriber station (20), the call leg to the first subscriber station (10) will be released by the SN and an ISUP_Release message will be sent to the FSC (not shown in the figure).

In case the CDP of the first information does exist in the database and the CGP of the first information is allowed to call the second subscriber station (20), the SN generates a correlationID=+4917801234xx, which belongs to the MSISDN number range of the GSM network (second network 2) and where 'xx' is a placeholder for a number of the number range '00-99', e.g. correlationID=+491780123401. Further, this correlationID will be mapped to the CGP=+492114444444 and the CDP=+495555555555 and saved in a separate table. After, the SN initiates a new call by sending an ISUP_IAM message 153 (second information) to the FSC. This new ISUP_IAM message 153 (second information) includes the new CDP=+491780123401, which is identical with the correlationID, and the CGP=+492114444444 of the first subscriber station (10) and the OriginalCalledNumber=+491771234567, which is the GSM number of the second subscriber station (20).

The FSC analyses the new CDP of the second information and routes the call to the GatewayMobileSwitchingCenter (GMSC) 21 of the GSM-network (second network 2) by sending an ISUP_IAM message 154 (second information), which includes the CDP=+491780123401, the CGP=+492114444444 and the OriginalCalledNumber=+491771234567.

The GMSC (second network unit 21) responds with an ISUP_ACM message 155 and sends it to the FSC. The FSC forwards the ISUP_ACM message 156 to the SN. Further, the GMSC has configured a service triggering based on received called party numbers, which is a common functionality of a switch. Thus, the GMSC starts analysing the CDP+491780123401 of the received ISUP_IAM message 154 (second information) and notices that it belongs to the reserved called party number range +491780123400-+491780123499 of the virtual fixed net service and starts triggering to the SCP (second module 22) by sending a CAMEL_InitialDP operation 157. This CAMEL_InitialDP operation 157 includes at least the CDP=+491780123401, the CGP=+492114444444 and the OriginalCalledPartyID=+491771234567 of the second information.

The SCP (second module 22) checks the OriginalCalledPartyID=+491771234567 (second subscriber station 20) of the second information by querying a database, whether this subscriber is provisioned for the virtual fixed network service and which 'virtual fixed network number', here +495555555555, is mapped to this number.

In case, the OriginalCalledPartyID=+491771234567 of the second information is not listed in the database, the SCP (second module 22) sends a CAP_ReleaseCall operation with e.g. 'cause=unallocated number' to the GMSC, not shown in the figure, which will be mapped to an ISUP_Release message and sent to the FSC, which forwards it to the SN, which analyzes the 'cause=unallocated number' and releases the call leg to the first subscriber station (10).

In case, the OriginalCalledPartyID=+491771234567 of the second information is listed in the database, the SCP (second module 22) sends a MAP_SRI message 158 to the HLR 23, which includes the MSISDN=+491771234567 of the second subscriber station (20), to request the Mobile Station Roaming Number (MSRN) of the MSISDN (second subscriber station 20). The HLR 23 responds with a MAP_SRIres message 159, which includes the MSRN of the MSISDN (second subscriber station 20). Next, the SCP (second module 22) initiates a new call leg (second part of the connection), intended to contact the second subscriber station (20), by sending a CAMEL_InitiateCallAttempt (ICA) operation 160 to the GMSC, which includes at least the DestinationRoutingAddress (DRA)=MSRN and the CGP=(+<prefix>492114444444), where the <prefix> is a digit string e.g. <prefix>='999', which will be used by the second subscriber station (20) as indicator for a virtual fixed net call, e.g. CGP=+999492114444444. Further, the SCP (second module 22) sends a CAMEL_RequestReportBCSM (RRB) operation 160 to the GMSC to arm at least the different Detection Points (DP) for oCalledPartyBusy, oAnswer and oTermSeized. Also, the SCP (second module 22) sends a CAMEL_Continue operation 160 to the GMSC.

The GMSC responds with a CAMEL_ICAack operation 161 to the SCP (second module 22) and maps the parameters of the CAMEL_ICA operation 160 to an ISUP_IAM message 162 and sends it to the Visited Mobile Switching Center (VMSC) 24 of the second subscriber station (20). The ISUP_IAM message 162 includes at least the CDP=MSRN and the CGP=+999492114444444.

The VMSC 24 responds with an ISUP_ACM and ISUP_CallProgress (CPG) message including 'Event indicator=Alerting' 163 to the GMSC. This ISUP message 163 will be mapped at the GMSC to a CAMEL_EventReportBCSM (ERB) operation 164, which includes the eventTypeBCSM=oTermSeized and will be sent to the SCP (second module 22).

The SCP (second module 22) analyses the CAMEL_ERB operation 164 and notices that the second subscriber station (20) is alerting and starts releasing the original incoming call 154 from the fixed network (first network 1) by sending a CAMEL_ReleaseCall operation 165 to the GMSC, which includes e.g. a 'cause=normal call clearing'.

The GMSC maps the operation 165 to the corresponding ISUP_Release message 166 including 'cause=normal call clearing' and sends it to the FSC.

The FSC forwards the ISUP_Release message to the SN 167, which analyses the cause value and confirms to release the call leg to the GSM network (second network 2), by sending an ISUP_ReleaseComplete message 168 to the FSC.

Further, the SN uses the cause value as identifier to start an internal expiry timer for the later call back call, which will be set up within the GSM network (second network 2), and to keep the call leg to the first subscriber station (10) (first part of the connection) by sending an ISUP_CPG message 169 to the FSC.

In case the second subscriber station (20) is not alerting, e.g. busy, the VMSC 24 will respond in step 163 with an ISUP_Release message including e.g. 'cause=user busy'. This message will be mapped at the GMSC to a CAMEL_ERB operation 164 including eventTypeBCSM=oBusy and will be sent to the SCP (second module 22). The SCP (second module 22) will analyse this operation and will stop the call back procedure and will release the original incoming call 154 from the fixed network (first network 1) by sending a CAMEL_ReleaseCall operation 165, which includes at least e.g. a 'cause=user busy' to the GMSC. This cause value will be sent via the FSC to the SN, which will confirm to release the call leg to the GSM network (second network 2) and the SN will also release the call leg to the first subscriber station (10) (first part of the connection) by sending another corresponding ISUP_Release operation to the FSC (not shown in the figure).

If, the second subscriber station (20) accepts the incoming virtual fixed network call, which was indicated on his display by using the number prefix '999', the second subscriber station (20) answers the call and the VMSC 24 sends an ISUP_Answer (ANM) message 170 to the GMSC, which maps this message to an CAMEL_ERB(oAnswer) operation 171 and sends it to the SCP (second module 22). The SCP (second module 22) analyses the message 171 and initiates a new interconnecting leg (the interconnection) from the GSM network (second network 2) to the partner network via the fixed network (first network 1) by sending a CAMEL_InitiateCallAttempt (ICA) operation 172 to the GMSC, which includes at least the DestinationRoutingAddress (DRA)=+495555555555 and the CGP=+491780123401. Further, the SCP (second module 22) sends a CAMEL_RequestReportBCSM (RRB) operation 172 to the GMSC to arm at least the answer Detection Point (DP) oAnswer and also sends a CAMEL_Continue operation 172 to the GMSC.

The GMSC responds with a CAMEL_ICAack 173 to the SCP (second module 22) and maps the parameters of the CAMEL_ICA operation 172 to an ISUP_IAM message 174 and sends it to the FSC of the fixed network (first network 1). The ISUP_IAM message 174 includes at least the CDP=+495555555555 and the CGP=+491780123401.

The FSC analyses the CDP and routes the call to the SN by sending an ISUP_IAM message 175, which includes at least the CDP=+495555555555 and the CGP=+491780123401.

The SN checks the incoming CGP, which is identical to the originally generated correlationID, and queries the internal table to retrieve the corresponding call data of the call leg to the first subscriber station (10) (first part of the connection). If, the correlationID does exist within the table, the SN will stop the expiry timer and sends an ISUP_ANM message 176 to the FSC for the interconnecting leg and a second ISUP_ANM message 177 to the FSC for the call leg of the first subscriber station (10) (first part of the connection). Next, the interconnecting leg (the interconnection) and the call leg of the first subscriber station (10) (first part of the connection) are bridged together by the SN.

The FSC forwards the ISUP_ANM message 178 to the GMSC, which maps this message to a CAMEL_ERB(oAnswer) operation 179 to the SCP (second module 22).

The SCP (second module 22) response with a CAMEL_MoveLeg and a CAMEL_ContinueWithArgument operation 180 to the GMSC, which instructs the GMSC to bridge the call leg to the second subscriber station (20) (second part of the connection) and the interconnecting leg.

The GMSC bridges the call leg of the second subscriber station (20) (second part of the connection) and the interconnecting leg. As a result the first subscriber station (10) and second subscriber station (20) are now connected to each other. Further, the GMSC sends a MoveLegAck operation 181 to the SCP (second module 22), which starts with the charging of the second subscriber station (20) for the call leg of the second subscriber station (20) (second part of the connection) and the interconnecting leg based on the corresponding tariff to which he has subscribed. The GSM operator of the second network (2) is responsible for charging the second subscriber station (20) and has the control over the interconnection leg. The first subscriber station (10) will be charged by the fixed network operator (first network 1) for the call leg of the first subscriber station (10) (first part of the connection) based on the dialed virtual fixed network number. The above mentioned example of a Call Flow as applied in a virtual fixed network number setting, can also be applied in a setting where the second subscriber station is coupled to a prepaid subscription. In this case the SN could use in step 153 in the ISUP_IAM message (second information) the normal prepaid GSM subscriber number (second subscriber station 20) as new CDP instead of generating another correlationID. The message 154 will be received by the GMSC, which handles the incoming call like a normal Mobile Terminating Call and starts querying the HLR (module 23) to get the trigger criteria. After that, the GMSC triggers to the corresponding SCP (step 157), which handles the prepaid service and the virtual fixed network service in parallel.

Figure 6:
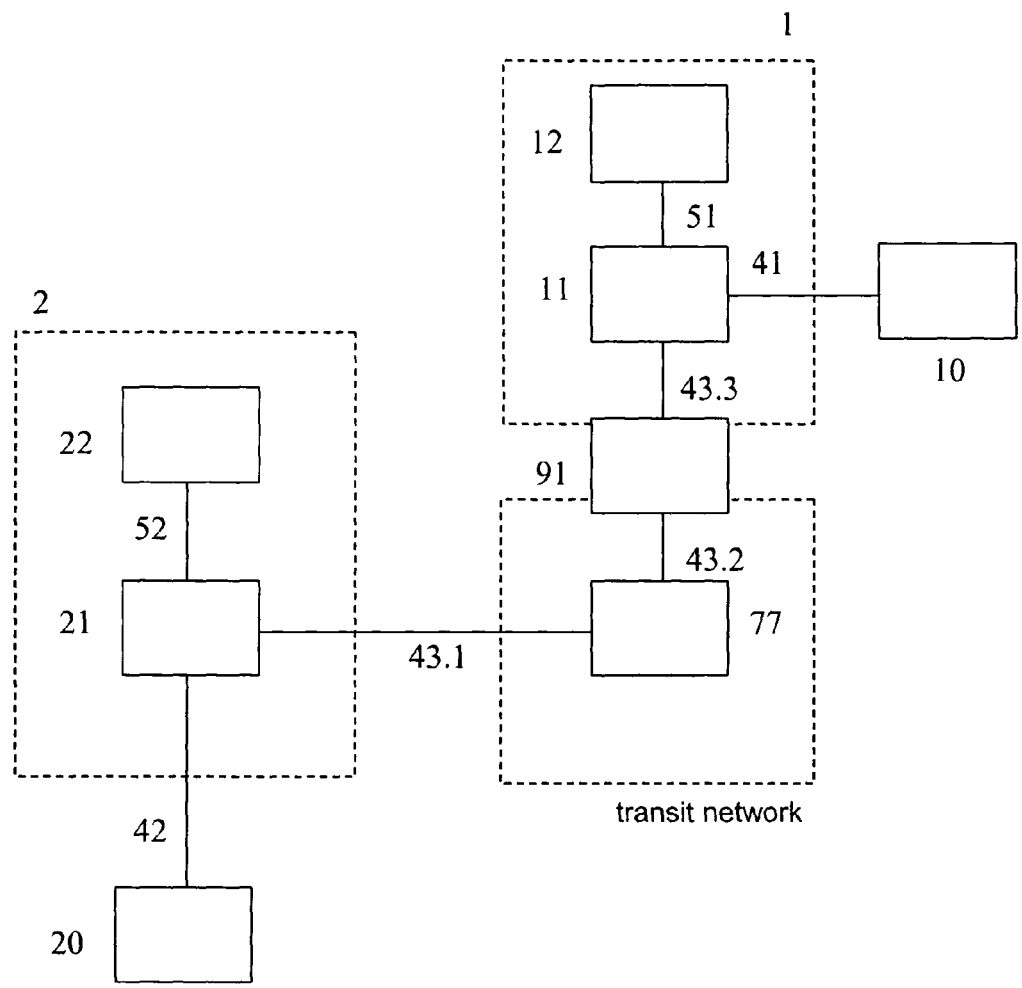
FIG. 6 shows another schematic of a high level architecture of example networks.

In FIG. 6 it is illustrated how the invention might be applied in a (business) community setting. The basic idea of this embodiment is the concept of a (business) community, for example in the sense that users of terminals at a private telecommunication system and some specific Mobile Stations (MS) in the mobile network form a FMC Community (Fixed-mobile Convergence) with special tariffs or features for the communications between members of this group. This FMC could for example consist of employees (users) all belonging to the same company.

The user, who initiates the communication, uses the terminal 10 (first subscriber station) connected to the network 1. In this example network 1 is an IP network supporting the SIP protocol, the module 11 is a VoIP system, the terminal 10 is a VoIP telephone set and the module 12 is a B2BUA (Back to Back User Agent). The terminals 10 and the MS 20 are both part of the community.

In this example the network 2 (the second network) is a mobile network following the GSM or UMTS standard and is connected via coupling 43.1 with a fixed network, which in this case serves as a transit network. There could be a direct interconnection between the network 2 (mobile network) and the network 1 (VoIP network), but in this example the connection between both networks has to be supported by the fixed network as a transit network. The transit network and VoIP network (network 1) are coupled by the couplings 43.2 and 43.3 via module 91, which contains a MG (Media Gateway) and a SG (Signalling Gateway) controlled by a MGC (Media Gateway Controller).

In a first step the user, who initiates the communication at the terminal 10, will be authenticated by the application comprised in the module 12. This authentication is for example performed based on the IP address of the (VoIP) terminal (10). Subsequently in an authorisation step, the application verifies, which service features are activated for the user, for example depending on the time, day, communication status, specific rights given by the administrator etc.). The authorisation is performed by checking the specific service data for the authenticated user. This data has to be looked up in the database that is part of or accessible by the module 12. The specific service data can consist of global type parameters determined by the specific mobile subscription, service type parameters determined by the administrator of the VoIP system or user individual data, configured by the administrator on behalf of the user, on behalf of a third party or by the user himself.

In this example at least the following global type data have been stored in this specific database: the IP addresses and the VoIP addresses of all VoIP telephone sets and the addresses (MSISDN) of all mobile stations belonging to the FMC community with the identification "xyz". In the module 22 in the network 2 as the counterpart of the module 12, all MSISDNs and all VoIP addresses of the FMC community "xyz" and the network address of the module 12 have been stored in a database accessible for the module 22.

In this example the user of the VoIP telephone set (10) with the number "0211 448 4788" of the company Eplus wants to communicate with the mobile station (20) with the MSISDN "0177 1234567". Both numbers belong to the same FMC community "xyz". The user of the VoIP telephone set (10) dials the number "0177 1234567" and the VoIP telephone set forms a SIP message with the dialed number in the "TO:field" and the SIP:02114484788@eplus.de in the "FROM:field" of the header of the SIP message INVITE. The VoIP system (first network unit 11) is configured in a way that communications from the address SIP:02114484788@eplus.de will be routed to the module 12 by means of sending an INVITE message. The module 12 receives the INVITE message and fetches the dialed number "0177 1234567" from the "TO:field", the number of the VoIP telephone set (10) "0211 448 4788" from the "FROM:field" and the IP address of the VoIP telephone set from the "VIA:field" in the header of this INVITE message. The module 12 queries its data base and checks the authentication of the user based on the IP address of the VoIP telephone set 10. After the successful authentication the module 12 checks whether the VoIP telephone set 10 with the number "02114484788" and the mobile station 20 (the second subscriber station) with the number "0177 1234567" belong to the FMC community "xyz" and if so, which specific rights they have to use the features of the FMC community "xyz". After the check is done successfully, the module 12 hold this connection (the first part of the connection) from the VoIP telephone set 10 to the module 12 and initiates a new session (a temporary connection) starting with an INVITE message with the address of the VoIP telephone set 10 in the "FROM: field" and the MSISDN "0177 1234567" in the "TO:field" of the header of this SIP message. The gateway 91 receives this INVITE message and terminates the VoIP session. Based on the parameters in the received INVITE message the gateway 91 sends out an IAM (Initial Address Message) to the FSC (Fixed line Switching Centre—module 77 of the transit network) following the ISUP (ISDN User Part) specification of the SS7 protocol, whereby the gateway 91 translates the content of the "TO: field" of the SIP message header, the number "0177 1234567" of the mobile station 20, in the CDP (Called Party Number) of the ISUP_IAM message and the content of the "FROM:field", the address of the VoIP telephone set (10) "02114484788", in the CGP (Calling Party Number) of the ISUP_IAM message. The transit network routes the ISUP_IAM message to the network 2 without any changes of the addresses in the ISUP_IAM message. The GMSC (Gateway Mobile Switching Center—second network unit 21) of the mobile network (network 2) receives the ISUP_IAM message and responds with the ISUP_ACM (Address Complete Message) to the transit network, which routes this message to the gateway 91. The gateway 91 translates this information in a SIP message and sends a SIP message "180 Ringing" to the module 12. In parallel the GMSC triggers at the detection point Detection Point "DP Terminating_attempt_authorised" of the terminating BCSM (Basic Call State Model) following the CAMEL (Customised Application Mobile network Enhanced Logic) standard and the GMSC transfers the call parameter to the module 22 (in this example the module 22 is a SCP (Service Control Point)), using the CAP (CAMEL Application Part) operation IDP (initial Detection Point) including the CDP number "0177 1234567" (MSISDN of the mobile station 20) and the CGP number 02114484788 (number of the VoIP telephone 10). The module 22 queries its data base and recognises the FMC community call by verifying both addresses as members of the FMC community "xyz". The SCP (module 22) initiates a new connection (the second part of the connection) instructing the GMSC by using the CAP_ICA (Initiate Call Attempt) operation, which includes the CDP number "0177 1234567" (MSISDN of the mobile station 20) and the CGP number "02114484788" (number of the VoIP telephone 10). If the user of the mobile station 20 (second subscriber station) takes the call, the GMSC receives an ISUP_ANM (Answer) message. The GMSC maps this message and sends to the SCP a CAP_ERB_oAnswer operation. In response to this the SCP instructs the GMSC to release the temporary connection by sending a CAP_Release operation to the GMSC. The GMSC maps this operation and sends an ISUP_Release message via the transit network to the gateway 91, which maps the ISUP_Release message and sends a SIP_BYE message via the VOIP system (first network unit 11) to the module 12. The temporary connection is released without any charging actions in the networks because no ISUP_ANM was formed for the temporary connection. Further the SCP instructs the GMSC to establish an interconnecting leg (the interconnection), by sending the CAP_ICA (Initiate Call Attempt) operation with COP number "0177 1234567" (MSISDN of the mobile station 20) and the CDP number ("02114484788" (number of the VoIP telephone set 10). The GMSC maps this operation and sends out the ISUP_IAM to the transit network. In this ISUP_IAM message the CGP number "0177 1234567" (MSISDN of the mobile station 20) and the CDP number ("02114484788" (number of the VoIP telephone set 10) is used. The FSC in the transit network (module 77) receives this message and routes the call to the gateway 91, which translates the CGP and CDP number in the "FROM:field" respectively in the "TO:field" of the header of the SIP operation INVITE. The module 12 receives this INVITE message and recognises through the Correlation_ID (in this case the number "02114484788" (number of the VoIP telephone set 10) is used) the correct relation between the first part of the connection, and the interconnection. The module 12 bridges the first part of the connection and the interconnection and sends out in response to the INVITE message for the interconnection a SIP message "2000K" to the gateway 91. The gateway 91 translates this information in an ISUP_ANM message, which will be received finally by the GMSC (second network unit 21) of the mobile network (the second network 2). The GMSC maps this message and sends to the SCP a CAP_ERB_O_Answer (Event Report BCSM) operation. In response the SCP sends a CAP_MoveLeg and a CAP_ContinueWithArguments operations, which instructs the GMSC 21 to bridge the second part of the connection (GMSC to mobile station 20) with the interconnection (GMSC to the module 12 via the FSC (module 77) and the gateway 91). Now a complete end-to-end connection between the VoIP telephone set 10 and the mobile station 20 is established. When the GMSC receives the ISUP_ANM (Answer) message for the interconnection, the GMSC starts the charging for the interconnection (the "call back connection" along the coupling 43.1) between the mobile network (network 2) and the transit network. Based on this charging record, the service provider, who offered this FMC community service, can bill the subscriber e.g. a company, who has subscribed to this FMC community service, not depending on a (regulated) termination fee for calls from the fixed network to the mobile network.

Figure 7:
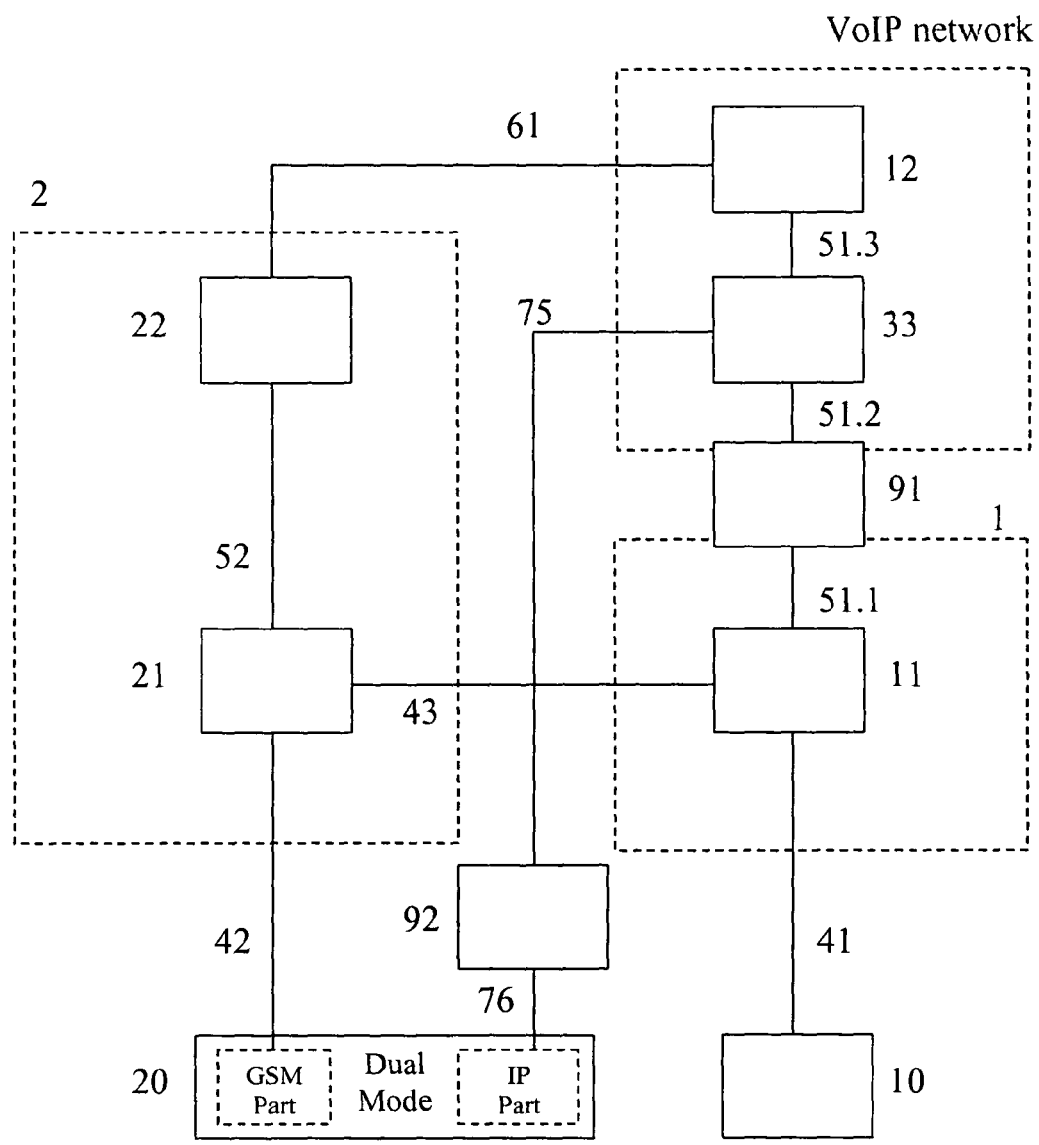
FIG. 7 shows another schematic of a high level architecture of example networks.

FIG. 7 shows another use case, in which it is illustrated how the invention might be applied using a Dual-Mode handset as the second subscriber station. It is assumed that the network 2 (the second network) is a mobile network following the GSM or UMTS standard and is expanded with the module 22 (the second module) to provide the specific application to support the invention. The network 1 (the first network) is a fixed network and contains no specific functionality for the support of the invention. There is a further network involved, which is a VoIP network of a VoIP (Voice over Internet Protocol) operator containing a complete VoIP architecture implemented in a VoIP System (module 33). This VoIP network contains the module 12 (the first module), which interacts via the coupling 61 with the module 22 in the mobile network.

The subscriber uses a so-called dual-mode handset (the second subscriber station 20), which supports the access to the GSM/UMTS network as well as to a WLAN (Wireless Local Area Network) provided by module 92, connected via the internet or VPN (75). The mobile network (2) is connected via coupling 43 to the fixed network (1) for the support of public communication services such as speech and data services.

In this example there is no direct connection for this kind of services between the mobile network (2) and the VoIP network. Communications between these networks is supported by the fixed network (1) which functions as a transit network. Only for the dedicated data transfer between the module 12 and the module 22 the coupling 61 is introduced. The connection between the fixed network (1) and the VoIP network requires a specific gateway (module 91), which consists of a MG (Media Gateway) and a SG (Signalling Gateway) controlled by a MGC (Media Gateway Controller), which translates the parameters of the communications from the telecommunication area in the IP area and vice versa.

The user (subscriber) of the Dual-Mode handset (second subscriber station) only needs one phone for the access to services offered by two different networks based on different technologies with different tariffs for communication services. This subscriber communicates just one number (called the One Number, typically a fixed net number) to his communication partners. There is a need for cooperation between the mobile network operator and the VoIP operator. Both the VoIP operator and the mobile operator can also benefit from the invention applied in a One Number service. At first glance the advantage for the VoIP operator is more obvious, because he serves the customer with a higher priority and attracts traffic. In contrast the mobile network operator could loose traffic because the customer is using the VoIP part of the Dual-Mode handset as much as possible. In many scenarios however it could be advantageous also for the mobile network operator to implement the invention. For example if the mobile operator has a weak position in the market segment "business customers", but the VoIP operator has a very strong position in this area. Then the mobile network operator will gain new business customers easily from the customer base of the VoIP provider for low acquisition cost. The mobile network operator can offer an attractive price for this service to the newly gained mobile customers without cannibalisation of existing traffic.

The example is further detailed below.

The IP part of the dual-mode handset (20) acts as a UA (User Agent) and has an access over the WLAN of a hot spot (coupling 76) provided for example by an 802.11b access point depicted as module 92 connected over the interne or a VPN (75) to the VoIP system (33). Via this connection the IP part of the dual-mode handset can register, establish sessions and terminate sessions following the IETF (Internet Engineering Task Force) standards for SIP (Session Initiation Protocol) in interaction with the VoIP system 33. With the SIP message REGISTER the IP part of the dual-mode handset is able to transfer the actual address to the registrar server as a part of the VoIP system (33). As a result the VoIP system (33)

has always the information, whether the IP part of the dual-mode handset (20) is registered or not. If the user of the telephone set 10 (first subscriber station) with the telephone number "0211 448 4788" wants to communicate with the user of the dual mode handset (20), he initiates the communication by dialing for example the One Number "0211 9988777" belonging to the number range of fixed numbers of the VoIP operator of the VoIP network. These numbers, the 'One Number service' number "0211 9988777" as the CDP (Called Party Number) and the number "0211 448 4788" of the telephone set 10 as the CGP (Calling Party Number) are transferred by a SET UP message as standardised in the DSS1 (Digital Subscriber Signalling Protocol number 1) protocol to the FSC (Fixed line Switching Centre) depicted as first network unit 11 in FIG. 7. The FSC recognises by analysing the CDP number that the destination is located in the VoIP network and establishes a connection to the gateway 91 over the coupling 51.1 using the IAM (Initial Address Message) of the ISUP (ISDN User Part) protocol of the SS7 (Signalling System Number 7) standard. This ISUP JAM message uses the CDP number and the CGP number as given by the DSS1_Set Up message. The gateway (91) translates this information in an INVITE message of SIP (Session Initiation Protocol) standard, whereby the CDP number (the One Number "0211 9988777") is inserted in the "TO:field" and the CGP number ("0211 448 4788" the number of the telephone set 10) is inserted in the "FROM:field" of the INVITE message. The gateway 91 sends the INVITE message to the VoIP system (module 33) via coupling 51.2. As mentions before the VoIP system (33) has always the information, whether the IP part of the dual-mode handset is registered or not. In case of the status "registered" of the IP part of the dual-mode handset, the session will be forwarded to the IP part of the dual-mode handset over the couplings 75 and 76. In case the IP part of the dual-mode handset is not registered, the VoIP system (33) redirects the session to the module 12 via coupling 51.3. This module (12) acts as a B2BUA (Back-to-Back User Agent) and terminates the INVITE message and the RTP (Real Time Protocol) stream, which contains the pay load of the session. The module (12) recognises the One Number service by the content of the "TO:field" (the One Number "0211 9988777") of the INVITE message, responds with the SIP message "180 Ringing" and holds this session as the first part of the connection. The SIP message "180 Ringing" will be received by the gateway 91, which translates the "180 Ringing" message in an ISUP_ACM (Address Complete Message) to inform the FSC (11).

In the next step the module 12 initiates a dedicated data transfer to the module 22 via the coupling 61 using any data protocol with the parameter "A: 0211 448 4788" for the number of the caller, the parameter "B: 0177 1234567" for the address of the GSM part of the dual mode handset and the parameter "C: 0211 9988777" for the One Number. The module 22 is a SCP (Service Control Point) as specified in the CAMEL (Customised Application Mobile network Enhanced Logic) standard and is connected via the coupling 52 to the MSC (Mobile Switching Centre) (second network unit 21) of the mobile network (network 2). The SCP (module 22) receives and checks this data and send the CAP_ICA (CAMEL Application Part, Initiate Call Attempt) operation via the coupling 52 to the MSC, which contains the DRA (Destination Routing Address), the number "0177 1234567" (MSISDN of the GSM part of the dual-mode handset) and the CGP number, the number "0211 448 4788" (address of the telephone set 10, the number of the caller).

The MSC (second network unit 21) receives this CAP_ICA operation and establishes a new connection (the second part of the connection) between the MSC and the GSM part of the dual-mode handset (20) via the coupling 42 using the ISUP_IAM with the number "0177 1234567" as the CDP (Called Party Number) and the number "0211 448 4788" as the CGP (Calling Party Number). If the user of the GSM part of the dual-mode handset (20) takes the call, the MSC will receive an ISUP_ANM (Answer) message. The MSC triggers at the detection point (DP) "O_Answer" and informs the SCP by means of a CAP_ERB answer operation. In response to this the SCP instructs the MSC (21) to establish the interconnection between the MSC (21) and the module 12 via the FSC (module 11), the gateway 91 and the VoIP system 33, by sending a CAP_ICA (Initiate Call Attempt) operation to the MSC (21) with CGP number "0177 1234567" and DestinationRoutingAddress number "0211 9988777" (One Number number). Subsequently the MSC (21) maps this received operation and sends out the ISUP_IAM with the CGP number "0177 1234567" (MSISDN of the GSM part of the dual-mode handset 20) and the CDP number "0211 9988777" (One Number number) to the FSC (module 11). The FSC (module 11) receives this message and routes the call to the gateway 91, which translates the CGP and CDP number into the "FROM:field" respectively into the "TO:field" of the header of a SIP message INVITE. The module 12 receives this INVITE message and recognises by the Correlation_ID (in this case the number "0211 9988777", the One Number number) the correct relation between the first part of the connection and the interconnection. The module 12 bridges the first part of the connection and the interconnection and responds to the INVITE message with the SIP message "200 OK" to the gateway 91. The gateway 91 then translates this information in an ISUP_ANM (Answer) message, which will be received finally by the MSC (21) of the mobile network (the second network). The MSC triggers at the detection point DP O_Answer and informs the SCP by sending a CAP_ERB_O_Answer (Event Report BCSM) operation. In response to this, the SCP sends a CAP_MoveLeg and a CAP_ContinueWithArguments operation, which instructs the MSC to bridge the second part of the connection (MSC to the GSM part of the dual-mode handset 20) with the interconnection (MSC to the module 12 via the FSC (module 11), the gateway 91 and the VoIP system 33). Now a complete end-to-end connection between the telephone set (10) and the GSM part of the dual-mode handset (20) is established.

When the MSC receives the ISUP_ANM (Answer) message for the interconnection, the MSC starts writing charging records for the interconnection (coupling 43) between the mobile network (the second network 2) and the fixed network (the first network 1). Based on these charging records the service provider, who offered this "One Number" service, can bill the subscriber, who has subscribed to this service, not depending on a (regulated) termination fee for calls from the fixed network to the mobile network.

While the invention has been illustrated and described in detail in the drawings and the description, these drawings and this description are considered to be illustrative disclosures or exemplary disclosures, but not restrictive disclosures. The invention is not limited to the described embodiments. Other variations to the disclosed embodiments can be understood and effected by a person skilled in the art. In the claims, the word "comprising" does not exclude other elements or steps, and the indefinite article "a" or "an" does not exclude a plurality. A single processor or other single unit may fulfill the functions of several items recited in the claims. The mere fact that certain features are recited in mutually different dependent claims does not indicate that a combination of these measured cannot be used to advantage. A computer program product may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be considered to limit the scope.

The invention claimed is:

1. A method for setting up a connection via an interconnection between different first and second networks, the method comprising:
   setting up a first part of the connection from a first subscriber station to at least the first network unit in the first network,
   receiving first information at a first module located in or connected to the first network, the first information comprising at least part of a first identification of the first subscriber station, and at least a part of a second identification of a second subscriber station that is to be called and which causes the first part of the connection to be set up to at least the first network unit,
   in response to the first information being received by the first module, sending second information from the first module to a second module in or connected to the second network, the second information comprising instructions for setting up an interconnection from the second network to the first network, causing the charging control of the interconnection to take place outside the first network,
   in response to the second information being received by the second module, setting up the interconnection, the interconnection being set up from the second network to the first network via the first network unit, the interconnection being connected to the pre-existing first part of the connection,
   in the second network setting up a second part of the connection to the second subscriber station, and
   connecting the second part of the connection to the interconnection.

2. The method according to claim 1, comprising
   in response to the first information being received by the first module, setting up a temporary call leg from the first network to the second network, and
   subsequently releasing the temporary call leg in the second network.

3. The method according to claim 2, wherein the second information is sent to the second module during the set up of the temporary call leg.

4. The method according to claim 1, wherein the second information comprises a third identification of a second subscriber station, the third identification being different from the second identification of the second subscriber station in the first information, the first module determining said third identification based on the first information received.

5. The method according to claim 1, wherein the second information comprises a correlation ID, determined by the first module in response to the receipt of the first information, wherein the correlation ID can optionally be used by the second network to route the second information to the second module, wherein the correlation ID is sent back from the second network to the first network during the set up of the interconnection, and wherein the returned correlation ID is analyzed, resulting in the interconnection being connected to the first part of the connection.

* * * * *